United States Patent [19]

Elleman et al.

[11] 4,420,977

[45] Dec. 20, 1983

[54] ACOUSTIC ROTATION CONTROL

[75] Inventors: Daniel D. Elleman, San Marino; Arvid P. Croonquist, Pasadena; Taylor G. Wang, Glendale, all of Calif.

[73] Assignee: The United States of America as represented by the Administrator of the National Aeronautics and Space Administration, Washington, D.C.

[21] Appl. No.: 358,089

[22] Filed: Mar. 15, 1982

[51] Int. Cl.³ .............................................. H02N 11/00
[52] U.S. Cl. ....................................... 73/505; 60/721; 318/116; 310/300
[58] Field of Search ................... 73/505; 74/5; 60/721; 310/300; 318/116, 118

[56] References Cited

U.S. PATENT DOCUMENTS 3,882,732 5/1975 Fletcher .................................. 73/505
4,139,806 2/1979 Kanber et al. ....................... 318/116

Primary Examiner—James J. Gill
Attorney, Agent, or Firm—John R. Manning; Paul F. McCaul; Thomas H. Jones

[57] ABSTRACT

A system is described for acoustically controlled rotation of a levitated object (12), which avoids deformation of a levitated liquid object. Acoustic waves (50, 52 in FIG. 6) of the same wavelength are directed along perpendicular directions across the object, and with the relative phases of the acoustic waves repeatedly switched so that one wave alternately leads and lags the other by 90°. The amount of torque for rotating the object, and the direction of rotation, are controlled by controlling the proportion of time one wave leads the other and selecting which wave leads the other most of the time.

7 Claims, 8 Drawing Figures

FIG. I
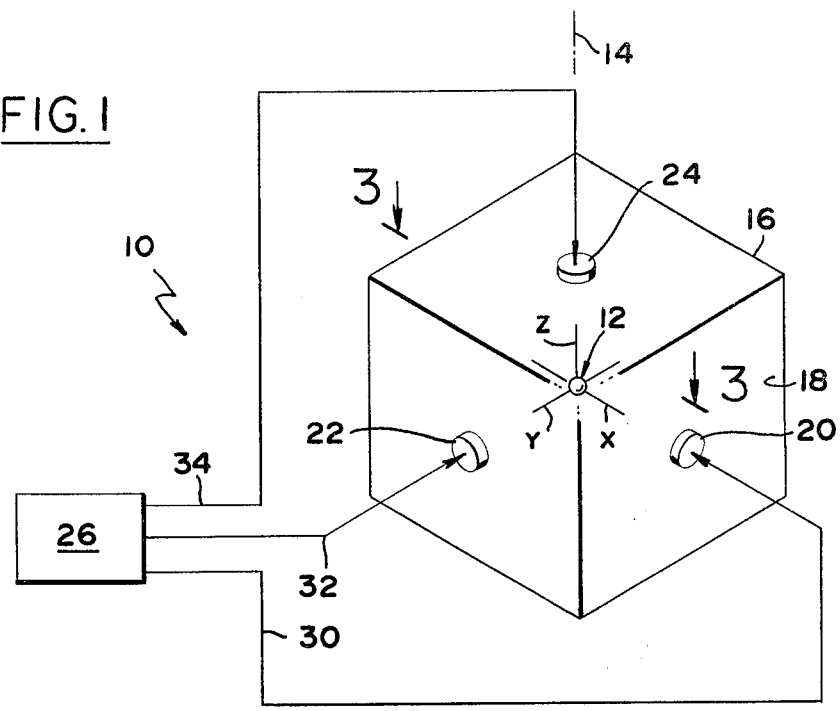
FIG. 2
PRIOR ART
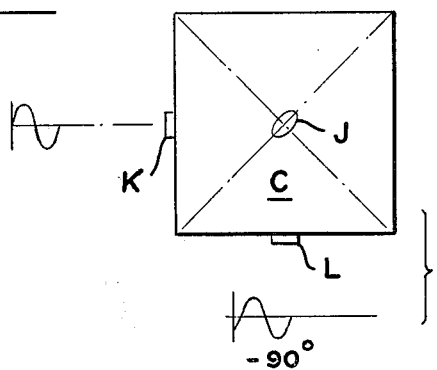
FIG. 3
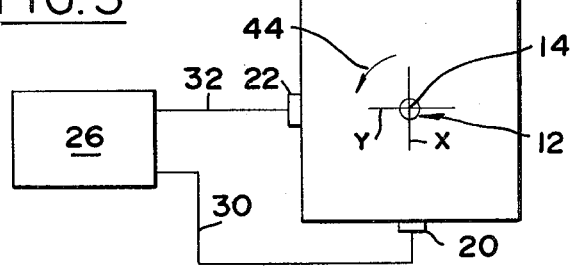

ACOUSTIC ROTATION CONTROL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Levitated objects can be rotated by controlling the relative phases of acoustic waves passing in different directions across the object. U.S. Pat. No. 3,882,732 by Wang et al. describes a method for rotating an acoustically levitated object lying in a chamber of square cross section, by controlling the relative phase of the waves used to levitate the object. The torque applied to the object depends upon the amplitude of the waves and the phase difference between them, with maximum torque being applied at a 90° phase difference and zero torque at a 0° phase difference. Although the torque on the object and consequently its rotation rate, can be controlled by adjusting the phase difference between the levitating waves, it has been found that at phase differences substantially different than 90°, liquid objects tend to become deformed. Such deformation does not occur at a 90° phase difference, but such a large phase difference can produce excessively high rotation rates. A method and apparatus for controlling rotation of an object which avoids deformation of liquid objects while permitting close control of rotation and with relatively simple equipment, would be of considerable value.

SUMMARY OF THE INVENTION

In one embodiment of the present invention, a method and apparatus are provided for easily controlling the torque applied to a levitated object. The method includes applying acoustic waves of the same wavelength along perpendicular directions across the object, to establish standing wave patterns. The relative phases of the acoustic waves are controlled so they are substantially 90° out of phase, but the relative phases are repeatedly switched so that each acoustic wave alternately leads and lags the other by 90°. The amount and direction of torque can be controlled by controlling the proportion of time when a particular one of the waves leads the other.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified perspective view of a system for controlling rotation of a levitated object, in accordance with the present invention.

FIG. 2 is a simplified sectional view of an object rotation technique of the prior art.

FIG. 3 is a partial sectional view taken on the line 3—3 of FIG. 1.

DESCRIPTION OF THE PREFERRED EMBODIMENTS

Figure 4:
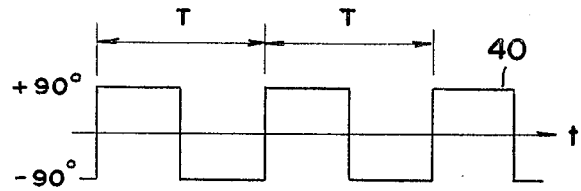
FIG. 4 is a graph showing the relative phases of the waves applied to the object in FIG. 3, when no net torque is applied to the object.

FIG. 1 illustrates a system 10 for levitating an object 12 which may be of solid or liquid material, and for rotating the object about at least a vertical axis 14. The system includes housing walls 16 forming a parallelepiped 18, and a group of three transducers 20, 22, 24 that can be energized to direct acoustic waves across the chamber. A circuit 26 has three output lines 30–34 that deliver signals to the transducers to drive them. Each of the transducers is driven at a frequency that produces a wavelength in the chamber that is resonant for the corresponding dimension of the chamber along its three axes, X, Y and Z. The acoustic standing waves can be used to levitate the object as well as to control its rotation. Each of the standing wave patterns has pressure wells (which are at the center of the chamber of rectangular cross section) to which the object is driven. By controlling the relative phases of acoustic waves, rotation of the object is also controlled.

FIG. 2 illustrates a technique of the prior art for controlling rotation of an object J within a chamber C of square cross section. This was done by energizing a pair of transducers K, L at the same frequency, and with the relative phase of their inputs closely controlled. When the two inputs are in phase, no torque is applied to the object and it does not rotate. The maximum torque is applied by maintaining the two inputs at a 90° phase difference, and with the direction of rotation determined by which input leads the other. The rotation torque has been adjusted by varying the relative phases of the two inputs to the transducers. However, when the phase difference is not 90°, the forces on the object are not isotropic, or in other words, are not the same in all directions. This causes a liquid object J to become deformed from a desired spherical shape. The directionality also can affect processing techniques where work is performed on a levitated object.

In accordance with the present invention, rotation of the suspended object 12 (FIG. 3) is controlled by driving the transducers 20, 22 so they are always substantially 90° out of phase, but with the relative phases being repeatedly switched at a rapid rate of many times per second; thus, the signal to each transducer such as 20 alternately leads and lags the input to the other transducer 22. The direction and rate of rotation can be controlled by determining the proportion of time that the input to one transducer such as 20 leads the other.

FIG. 4 includes a graph 40 showing the variation in the phase of the input to one transducer 22 with respect to the other 20 with time, when no object rotation is desired. In each cycle of operation of the period T, the input to the first transducer 20 leads the second 22 during one-half of the cycle period T, and lags the other by 90° during the other half of the cycle period. Thus, the first transducer 20 (or the input thereto and the output therefrom) leads the other 50% of the time when no rotation is desired.

Figure 5:
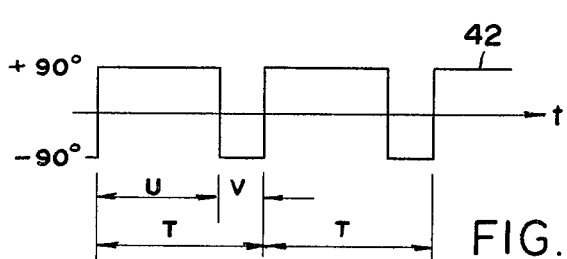
FIG. 5 is a graph similar to FIG. 4, but showing the relative phases when torque is applied in a predetermined direction to the object.

FIG. 5 includes a graph 42 showing the change in phase with time, when the object is to be rotated in a predetermined direction indicated by arrow 44 in FIG. 3. The time U when the first transducer 20 leads the other is more than half of the time of the complete cycle. Accordingly, the proportion of time when the first transducer 20 leads the other is more than 50%, to create a torque in the desired direction. It may be noted that while the switching of phase can be conducted in cycles that are all of the same duration T, it does not matter whether subsequent cycles are all of the same duration; only the proportion of time that one transducer leads the other determines the direction and amount of torque (of course, the intensity of the sound waves also determines the torque).

Figure 6:
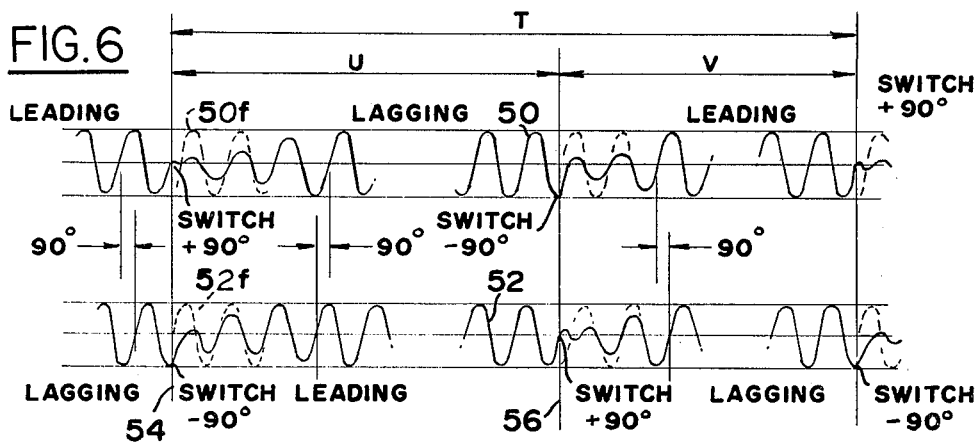
FIG. 6 is a graph showing the waveforms of the two waves applied to the object of FIG. 3.

FIG. 6 shows the waveforms of signals 50, 52 that are produced in the chamber in accordance with the phase graph on FIG. 5. At the time 54, which is at the beginning of the cycle, the phases of both waves have been switched by 90° in opposite directions (one advanced and the other retarded) and it requires a few cycles of each wave for the signal 50 or 52 to grow to its maximum amplitude. Thereafter, it can be seen that during the time period U the first signal 50 is lagging the other 52 by an angle of 90°. The relative phases can be appreciated by assuming that each graph 50, 52 is racing towards the starting time 54, and the second graph 42 is ahead of the other one 50 by one-quarter wavelength or 90°. At the end of the time period U, at the instant 56, the phases of waves 50 and 52 are changed by −90° and +90°, respectively. It can be seen that the first wave 50 then leads the other one 52 by 90° (i.e. the phase is −90° in FIG. 5).

The time period T of each cycle during which the relative phases are switched twice, is preferably small compared with the natural period of oscillation of the levitated object 12 to be rotated. This assures that any differences in the relative amplitudes of the two waves 50, 52 occurring during switching, produce minimal deformation or vibration of the object. Since it may require an appreciable time for each wave to build up to its maximum strength, it is also desirable for the cycle time T to be long enough to extend over many oscillations of the signals 50, 52. This will allow time for each signal such as 50 to build up to full strength after its 90° switching, and to provide time for a plurality of oscillations at substantially full amplitude, i.e. at least above 90% of full amplitude. To aid in understanding, the full amplitude of each wave is shown in phantom lines at 50f, 52f for a few cycles after each switching time 54 and 56.

Instead of switching the phase of both signals 50, 52 by 90°, it would be possible to maintain the continuity or phase of one wave such as 50 without switching its phase. Instead, the other signal 52 would be switched by 180°, to switch it between states wherein it was lagging or leading the other one. However, this would generate transients in only one of the waves 52. During such transients, the amplitude of the wave 52 would be less than the other 50, and this would lead to pressure pulses during each switching. Thus, by switching both waves simultaneously, inequalities in the amplitudes of the two waves are minimized to minimize oscillations of the suspended object.

As mentioned above, the amount of time between switchings is preferably long enough for each pulse-shifted signal to build up to nearly its maximum amplitude. The build-up time depends upon the Q of the chamber, or in other words, the ringing time during which the previous standing wave pattern continues to ring at appreciable amplitude in the chamber. The Q in typical chambers is about 100, so that the frequency bandwidth over which the intensity of the standing wave pattern is within 3 db of the intensity achieved at the center frequency, is 1/100th the center frequency. In that case, it requires perhaps 10 cycles for the new wave to build up to substantially its maximum amplitude. If the transients of the two waves 50,52 can be maintained at almost equal amplitudes at each instant, then fewer cycles of each signal are necessary. It is possible to switch only one of the channels by 180°, but then circuitry has to be installed to avoid the transient problem. In one system, the signals 50, 52 are of a frequency such as 5,000 Hz, and the time of each cycle T is 1/50th second so there are 100 cycles during each double switch.

Figure 7:
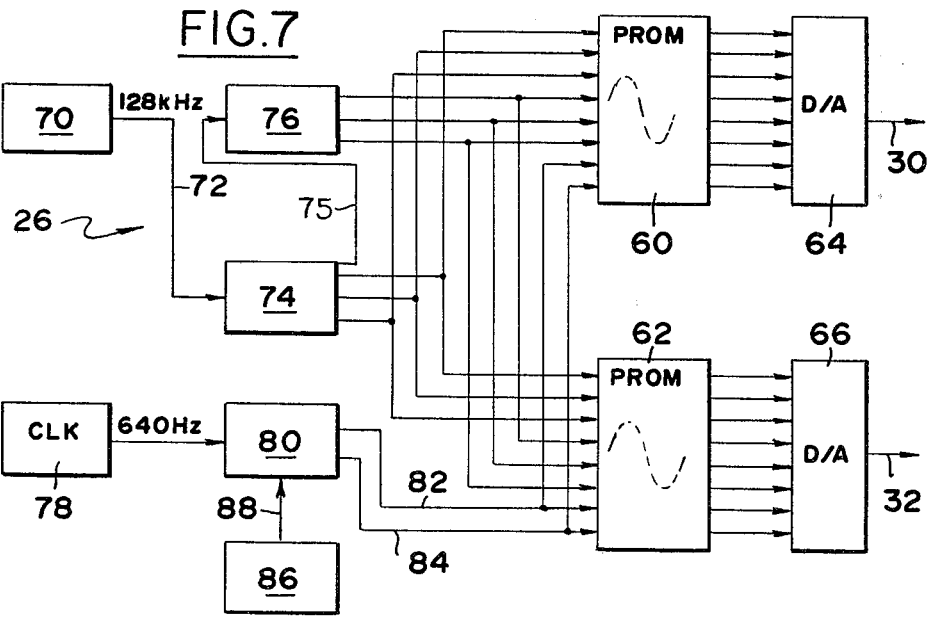
FIG. 7 is a more detailed block diagram of the circuitry of the system of FIG. 3.

FIG. 7 is a simplified illustration of a circuit 26 that has been constructed to generate a pair of signals of the type indicated at 50, 52 in FIG. 6. The circuit uses two programmable read only memories (PROMS) 60, 62 and corresponding digital-to-analog converters 64, 66 to generate each cycle of the signals 50, 52 in FIG. 6. Each of the PROMS stores 128 values representing points along one cycle of a sinewave. The inputs to each PROM determine which point along the sine wave appears on the output of the PROM. The inputs to each PROM are usually counts that repeatedly advance from 1 to 128 and begin at 1 again. However, at each 90° switch or shift, the count suddenly changes by a large amount, as by jumping from 1 to 32.

The circuit 26 includes a clock 70 having an output on line 72 of 128 kHz. This count is delivered to a digital counter 74 whose outputs are delivered to the three least significant digit inputs of each PROM such as 60. The most significant bit output on line 75 is also delivered to another counter 76 whose outputs are delivered to the next most significant digits of the PROM 60. Another clock 78 is used to generate a 640 Hz signal which is counted by a counter 80. The outputs 82, 84 of the counter are connected to the two msb (most significant bits) positions of each PROM. The outputs of the counter 80 determine when the phase switching occurs. A resetting circuit 86 delivers signals over a line 88 to the counter 80 to reset it twice during each period T, to determine the relative times when the output on line 30 leads or lags the output on the other line 32.

The outputs on lines 30, 32 can be amplified and applied directly to the transducers 20, 22 (FIG. 3) to rotate the levitated object 12. It is possible to utilize the same waves that control rotation of the object, to also levitate it in a horizontal direction, or in other words, to keep the object 12 at a particular position such as along the center line 14 of the chamber. It is also possible to utilize a higher frequency such as on the order of 40 kHz, that is resonant to the chamber dimensions to levitate the object, and to utilize the lower frequency outputs on lines 30, 32 to modulate the higher frequency, especially where the higher frequency can be more efficiently utilized by the transducers 20, 22.

Figure 8:
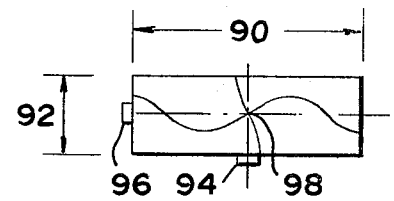
FIG. 8 is a simplified sectional view of a chamber of non-square cross section in which a levitated object is rotated.

Although a chamber of square cross section is shown in FIG. 3. It is also possible to utilize other cross sections. FIG. 8 shows a chamber of rectangular cross section, wherein the length dimension 90 of the chamber is three times the width dimension 92. In that case, one transducer 94 may be driven at the lowest resonant frequency of the chamber width, which is twice the chamber width 92, while the other transducer 96 may be driven at the third mode which has a wavelength equal to two-thirds the chamber length 90, to rotate an object located at one of the pressure wells or nodes of the third mode such at the position 98. It is also possible to utilize chambers of other shapes such as an elliptical cross section. It also may be noted that levitation of an object in one or more directions can be accomplished by electrostatic or magnetic fields, with the acoustic fields utilized only for rotation control.

Thus, the invention provides a method and apparatus for using acoustic waves to control rotation of an object, which minimizes deformation of the object and which is of relatively simple construction. This can be accomplished by applying acoustic waves of the same wavelength along different directions across the object, and controlling the relative phases of the acoustic waves so that they are substantially 90° out of phase, and by repeatedly switching the relative phases so that each acoustic wave alternately leads and lags the other by 90°. The direction and amplitude of the torque applied to the object, is controlled by controlling the proportion of time when the first of the waves leads the other, over an extended period of at least two switchings of the phases. The switchings can be accomplished by changing the phases of the waves by 90° simultaneously, to largely equalize the transients in the two waves, to thereby minimize unequal pressure pulses on the object. The switchings can be conducted at a frequency which is low enough to provide time for each wave to reach more than 90 percent of the maximum amplitude it would reach over a long period of time.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for controlling rotation of an object, comprising:
   applying acoustic waves along first and second different directions to said object, to establish standing wave patterns extending across the object location, with the wavelengths of the acoustic waves passing along said directions being equal;
   said step of applying including controlling the relative phases of said acoustic waves so they are substantially 90° out of phase, and repeatedly switching the relative phases so that each acoustic wave alternately leads and lags the other one by 90°.

2. The method described in claim 1 wherein:
   said step of controlling includes controlling the intervals between switchings so that the proportion of time when said first wave leads said second wave is a predetermined percentage, which is greater than 50% of the total time, whereby to rotate the object in a predetermined direction.

3. The method described in claim 1 wherein:
   at each switching of the relative phases, the phase of each wave is changed by 90°, whereby to provide largely equal transients in the two directions.

4. The method described in claim 1 wherein:
   said step of switching includes switching the relative phases at a frequency which is more than 1 Hz but which is low enough so that each wave has built up to more than 90° of its steady state amplitude before the next switching.

5. A method for controlling rotation of an object, comprising:
   energizing a pair of transducers to establish a pair of standing wave patterns that extend across perpendicular dimensions of a chamber of rectangular cross section, including driving said transducers with signals that are at the same frequency but 90° out of phase, and repeatedly switching both signals at 90° in cycles which are equal of a predetermined duration that is a fraction of a second and that has two portions with a first portion of each cycle that extends between the instants of time of two switchings being longer than the second portion of the cycle which extends between the end of the first portion and the beginning of the next cycle.

6. Apparatus for controlling rotation of an object, comprising:
   walls forming a chamber of predetermined cross-section;
   first and second transducers positioned to apply acoustic waves along first and second perpendicular dimensions of the chamber cross section; and
   means for driving said transducers to apply acoustic waves along said perpendicular dimensions, that are of the same wavelength but 90° out of phase, including means for repeatedly switching the relative phases of said waves so one alternately leads and then lags the other by 90°.

7. The apparatus described in claim 6 wherein:
   said means for repeatedly switching is controllable to vary the proportion of time, over a period which includes a multiplicity of switchings, that a first wave leads the other, whereby to enable control of the direction and magnitude of the torque applied to an object to rotate it.

* * * * *